US012393727B2

United States Patent
Almahmoud et al.

(10) Patent No.: US 12,393,727 B2
(45) Date of Patent: Aug. 19, 2025

(54) DISTANCE PRESERVING HASH METHOD

(71) Applicants: KHALIFA UNIVERSITY OF SCIENCE AND TECHNOLOGY, Abu Dhabi (AE); BRITISH TELECOMMUNICATIONS PLC, London (GB); EMIRATES TELECOMMUNICATIONS CORPORATION, Abu Dhabi (AE)

(72) Inventors: Abdelrahman Ali Almahmoud, Abu Dhabi (AE); Ernesto Damiani, Abu Dhabi (AE); Hadi Otrok, Abu Dhabi (AE); Yousof Ali Alhammadi, Abu Dhabi (AE)

(73) Assignees: KHALIFA UNIVERSITY OF SCIENCE AND TECHNOLOGY, Abu Dhabi (AE); BRITISH TELECOMMUNICATIONS PLC, London (GB); EMIRATES TELECOMMUNICATIONS CORPORATION, Abu Dhabi (AE)

( * ) Notice: Subject to any disclaimer, the term of this patent is extended or adjusted under 35 U.S.C. 154(b) by 530 days.

(21) Appl. No.: 17/601,145

(22) PCT Filed: Apr. 3, 2019

(86) PCT No.: PCT/EP2019/058428
§ 371 (c)(1),
(2) Date: Oct. 4, 2021

(87) PCT Pub. No.: WO2020/200447
PCT Pub. Date: Oct. 8, 2020

(65) Prior Publication Data
US 2022/0215126 A1  Jul. 7, 2022

(51) Int. Cl.
G06F 21/62 (2013.01)
G06F 18/22 (2023.01)
G06F 21/60 (2013.01)

(52) U.S. Cl.
CPC .......... G06F 21/6254 (2013.01); G06F 18/22 (2023.01); G06F 21/602 (2013.01)

(58) Field of Classification Search
None
See application file for complete search history.

(56) References Cited

U.S. PATENT DOCUMENTS 9,703,967 B1 * 7/2017 Kothari ............... H04L 63/0407
9,722,973 B1 * 8/2017 Kothari ............... H04L 63/0435
(Continued)

OTHER PUBLICATIONS

Han et al.; An Anonymization Method to Improve Data Utility for Classification; 2017; retrieved from the Internet: URL https://link.springer.com/chapter/10.1007/978-3-319-69471-9_5; pp. 1-15 as printed. (Year: 2017).*

(Continued)

Primary Examiner — Michael W Chao
(74) Attorney, Agent, or Firm — Calfee, Halter & Griswold LLP (57) ABSTRACT

A computer-implemented method of preparing an anonymised dataset for use in data analytics. The method includes the steps of: (a) labelling elements of a dataset to be analysed according to a labelling scheme; (b) selecting one or more labelled elements of the dataset to be replaced with a distance preserving hash; and for each selected element: (c) partitioning a data plane including the selected element into a plurality of channels, each channel covering a different distance space of the data plane; (d) hashing, using a cryptographic hash, data associated with the channel of the data plane in which the selected element resides, to form the (Continued)

distance preserving hash; and (e) replacing the selected element with the distance preserving hash.

15 Claims, 4 Drawing Sheets

(56) References Cited

U.S. PATENT DOCUMENTS

| | | | | |
|---|---|---|---|---|
| 9,852,311 | B1* | 12/2017 | Kothari | G06F 21/606 |
| 10,181,051 | B2* | 1/2019 | Barday | G06F 21/6254 |
| 10,318,757 | B1* | 6/2019 | Kenthapadi | G06F 16/24578 |
| 11,893,520 | B2* | 2/2024 | Silberman | G06N 20/20 |
| 11,921,888 | B2* | 3/2024 | Ren | G06F 21/6245 |
| 2007/0156677 | A1* | 7/2007 | Szabo | G06F 21/6245 |
| | | | | 707/999.005 |
| 2007/0233711 | A1* | 10/2007 | Aggarwal | G06F 21/6254 |
| 2008/0215842 | A1* | 9/2008 | Kerschbaum | G06F 21/6254 |
| | | | | 711/167 |
| 2011/0078143 | A1* | 3/2011 | Aggarwal | G06F 16/2465 |
| | | | | 707/E17.03 |
| 2011/0078779 | A1* | 3/2011 | Liu | G06F 21/6254 |
| | | | | 726/28 |
| 2014/0059695 | A1* | 2/2014 | Parecki | H04W 12/08 |
| | | | | 726/26 |
| 2015/0339488 | A1* | 11/2015 | Takahashi | G06F 16/285 |
| | | | | 726/29 |
| 2016/0196577 | A1* | 7/2016 | Reese | H04W 4/023 |
| | | | | 705/14.5 |
| 2016/0379011 | A1* | 12/2016 | Koike | G06F 16/285 |
| | | | | 726/26 |
| 2018/0004976 | A1* | 1/2018 | Davis | G06F 21/6254 |
| 2018/0276415 | A1* | 9/2018 | Barday | G06F 21/6254 |
| 2019/0050465 | A1* | 2/2019 | Khalil | G06F 16/212 |
| 2019/0087604 | A1* | 3/2019 | Antonatos | G06F 21/6245 |
| 2019/0258824 | A1* | 8/2019 | Gkoulalas-Divanis | |
| | | | | G06F 21/6254 |
| 2019/0260730 | A1* | 8/2019 | Mainali | H04L 63/0861 |
| 2019/0279247 | A1* | 9/2019 | Finken | H04L 9/0637 |
| 2019/0287027 | A1* | 9/2019 | Franceschini | H04L 9/3239 |
| 2020/0012797 | A1* | 1/2020 | Adir | G06F 21/6245 |
| 2020/0267936 | A1* | 8/2020 | Tran | A01K 29/005 |

OTHER PUBLICATIONS

Karapiperis et al., (2017), IEEE 33rd International Conference on Data Engineering, pp. 135-138.

Vatsalan et al., (2016), Journal of Biomedical Informatics 59, 285-298.

Lu et al. "Toward efficient and privacy-preserving computing in big data era," IEEE Network, vol. 28, No. 4, pp. 46-50, Jul. 2014.

Patel et al., "Privacy Preserving Distributed K-Means Clustering in Malicious Model Using Zero Knowledge Proof," in Distributed Computing and Internet Technology, ser. Lecture Notes in Computer Science, Springer, Berlin, Heidelberg, Feb. 2013, pp. 420-431.

Akhter et al., "Privacy-Preserving Two-Party k-Means Clustering in Malicious Model," in 2013 IEEE 37th Annual Computer Software and Applications Conference Workshops, Jul. 2013, pp. 121-126.

Xiong et al., "Predict: Privacy and Security Enhancing Dynamic Information Collection and Monitoring," Procedia Computer Science, vol. 18 pp. 1979-1988, Jan. 2013.

Yakoubov, et al. "A survey of cryptographic approaches to securing big-data analytics in the cloud", in 2014 IEEE High Performance Extreme Computing Conference (HPEC), Sep. 2014, pp. 1-6.

Gheid et al., "Efficient and Privacy-Preserving k-Means Clustering for Big Data Mining", in 2016 IEEE Trustcom/BigDataSE/ISPA, Aug. 2016, pp. 791-798.

* cited by examiner

$\quad\quad\quad\quad h_1 \quad\quad\quad\quad h_2 \quad\quad\quad\quad h_3$
$a$ [-920718708, 880502322, 1750140263]
$b$ [-499932849, 525743601, 1750140263]

192.0.0.0 → Element1
192.168.0.0 → Element2
192.168.1.0 → Element3
192.168.1.1 → Element4

[ Element1, Element2, Element3, Element4 ]

192.168.1.5

192.0.0.0 → Element1
192.168.0.0 → Element2
192.168.1.0 → Element3
192.168.1.5 → Element4

[ Element1, Element2, Element3, Element4 ]

Fig. 7

DISTANCE PRESERVING HASH METHOD

CROSS REFERENCE TO RELATED APPLICATIONS

The present application is a 371 of PCT Application No. PCT/EP2019/058428, filed Apr. 3, 2019, the entire disclosure of which is fully incorporated herein by reference as though fully set forth herein.

The present invention relates to a method of preparing an item of data for use in big data analytics.

Multi-party collaborative analytics, for example in the implementation of spam filters or the like, promise a more holistic perspective of the domain and therefore should increase the quality of the resulting analytics. However, data owners are increasingly concerned regarding the privacy and confidentiality of their sensitive data for obvious reasons.

Furthermore, regulations and laws often prohibit the sharing of personal information. For example, cross-country traffic management and border control agencies can benefit a great deal from sharing road sensor data with each other. Sharing traffic data cross neighbouring countries can enable multiple applications, one of which is the prediction of the size of incoming traffic. However, giving up real-time information about the behaviour of traffic and the way it flows through local infrastructure can allow malicious entities with access to the data to more efficiently initial attacks such as forcing accidents or attacking infrastructure congestion points. Furthermore, sharing data across countries is usually governed by laws and regulations. This issue becomes more relevant with the upcoming growth in driverless car adoption.

In order to address privacy concerns of data, a simple solution is to omit private features from the data. However, this approach greatly limits many of the possible collaborative applications as it can decrease the quality and accuracy of the analytics. Alternatively, some anonymization techniques—which are transformations that obfuscate data whilst retaining the ability to perform certain types of analysis—can be used to build collaborative privacy-preserving data analytic capabilities. However, conventional techniques are non-trivial to implement and come at a high cost in terms of complexity, accuracy, and computational performance.

Privacy-preserving analytics have been previously studied, and a wide range of techniques have been applied to realise such a systems. Homomorphic Encryption is one such system, and is a cryptosystem which allows certain operations to be performed on a cypher-text. The ability to perform mathematical operations on the cypher-text allows for the performance of a variety of privacy-preserving analytics. However, Fully Homomorphic Encryption is impractical for real-world applications and is computationally expensive [1].

Secure Multi-party Computation (SMPC) is another branch of privacy-preserving analytics. SMPC is known to be more efficient than Homomorphic Encryption. The techniques provided by SMPC enable a wide range of privacy-preserving analytics such as clustering [2], [3]. Attempts have been made to tackle the challenge of high computational cost incurred when preserving the privacy of continuously monitored data, by controlling the connection based on the feedback from previous collections [4]. However, unlike homomorphic encryption, these techniques are interactive, meaning that participants exchange messages between themselves. In many cases, multiple rounds of communication are necessary and this places additional strain on the network [5], [6]. Further, many of the SMPC models address specific constraints and scenarios that are not a primary concern in federated environments. While these constraints add in terms of the versatility of these models, by allowing for the secure distribution of the join computation, they substantially increase the complexity in implementing such models. Finally, the security verification process of SMPC implementing algorithms is a complex and rigorous process because SMPC heavily relies on the design choices.

Cryptographic hashes offer an attractive method of securing the privacy of data. Cryptographic hashes are functions which transform inputs into fixed sized alpha numeric representations (hashes). It is generally accepted that it is unfeasible to reverse a cryptographic hash back to its plaintext value. Unfortunately, these functions also destroy any form of distance between the plaintext data. This means that changing a single bit yields two different hashes such that any form of distance defined between the hashes does not correspond to any meaningful distance bon the plaintext. Example cryptographic hash algorithms include SHA and RipeMD.

For example, the RipeMD hash of "The quick brown fox jumps over the lazy dog" is: 37f332f68db77bd9d7edd4969571ad671cf9dd3b. Changing the 'd' in dog to a 'c' (resulting in 'cog') produces the following hash: 132072df690933835eb8b6ad0b77e7b6f14acad7, these hashes sharing no characters in the same position. This example demonstrates that whilst very similar plaintext strings produce very dissimilar hashes.

Figure 1:
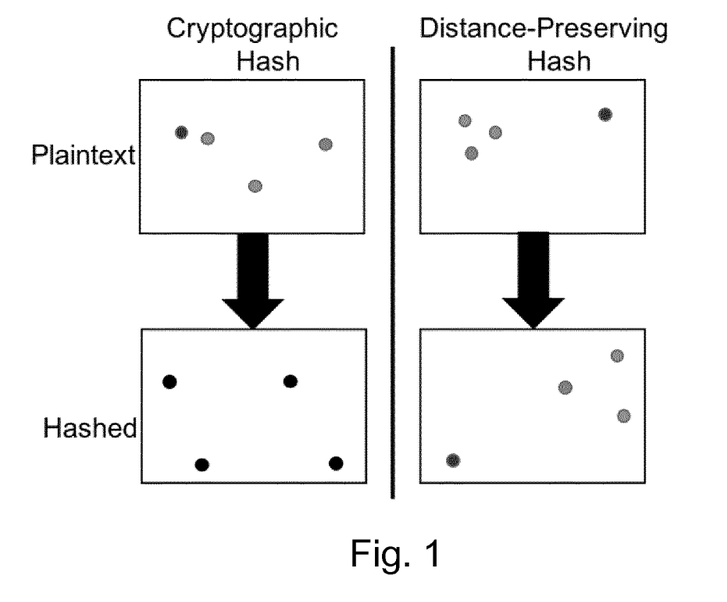
FIG. 1 illustrates the concept of distance-preserving hashes as compared to conventional cryptographic hashes.

Distance-preserving hashing techniques are transformations that obfuscate data while retaining various inter-point distances from the plain-text. It is possible then to perform distance computations over hashes produced by these algorithms, which allows for performing a variety of privacy-preserving analytics. These techniques have been used in various fields, such as forensics, to search for similarities between files in an efficient manner. An example of this concept is shown in FIG. 1.

The invention has been devised in light of the above considerations.

SUMMARY OF THE INVENTION

At its broadest, embodiments of the invention are concerned with the generation of a distance preserving hash to allow anonymised datasets to be shared for analytics.

Accordingly, in a first aspect, the invention provides a computer-implemented method of preparing an anonymised dataset for use in data analytics, the method including the steps of:
  (a) labelling elements of a dataset to be analysed according to a labelling scheme;
  (b) selecting one or more labelled elements of the dataset to be replaced with a distance preserving hash; and for each selected element:
  (c) partitioning a data plane including the selected element into a plurality of channels, each channel covering a different distance space of the data plane;
  (d) hashing, using a cryptographic hash, data associated with the channel of the data plane within which the selected element resist, to form the distance preserving hash; and
  (e) replacing the selected element with the distance preserving hash.

Advantageously, such a method can allow the sharing of otherwise sensitive data for use in data analytics whilst preserving distance information.

Herein, distance preserving hash may refer to a 'hash-comb' and said hash-comb may comprise plural hashes, particularly when the distance preserving hash is a multi-dimensional distance preserving hash (i.e. the number of dimensions of the multi-dimensional hash may correspond to the number of individual hashes forming the hash-comb). Herein, the term data plane may refer to the conceptual space of values which an element of data may take. For example, if the element of data was a 16-bit block private IPv4 address, the data plane may encapsulate the values 192.168.0.0 to 192.168.255.255. In some examples, the selected one or more labelled elements may be features from within a record in the dataset.

The method may include a step of sending, to an analytics server, the anonymised dataset including the distance preserving hash(es) once all of the selected elements have been replaced. The anonymised dataset as sent to the analytics server may be unlabelled. For example, the step of sending the anonymised dataset may include a step of unlabelling the labelled items of the dataset.

The distance preserving hash may be a multi-dimensional distance preserving hash having $\omega$ dimensions, each dimension being formed of C channels, each channel have a size $\gamma$, and wherein the steps (c)-(d) are repeated for each dimension of the multi-dimensional distance preserving hash. $\omega$ may be selected based on any one or more of: an accuracy metric, a privacy metric, and a distance metric. $\omega$ may be selected based on a quantization resolution metric, which is indicative of a distance from a given distance preserving hash to the associated selected element. Increasing the value of C and $\omega$ imparts more resolution from the plaintext to the hash-comb, and therefore increases the accuracy and reduces privacy. This measure of the hash-combs distance from the plaintext, and potential accuracy, is referred to as Quantization Resolution (QR). Increasing QR reduces the distance of a hash-comb from the plaintext which thereby decreases privacy whilst increasing an expected accuracy.

The method may further comprise a step, performed between steps (a) and (c), of selecting a subsample from the dataset and deriving therefrom an accuracy threshold indicative of the distance between items of data within the subsample. The method may further comprise a step of testing the accuracy of the method by deriving, from the anonymised dataset, an estimated accuracy of distance measurement between items of the anonymised dataset and comparing this estimated accuracy to the accuracy threshold. If the estimated accuracy is less than the accuracy threshold, the method may include increasing the value of $\omega$ and repeating steps (c)-(d).

The data associated with the channel of the data plane within which the selected element resides may be a generalised value based on the content of the respective channel. For example, if the selected element had the value '3.1' and resided within a channel encapsulating values greater than 3.0 and less than 4.0, the generalised value may be an average of the limits of the channel, e.g. 3.5.

The data associated with the channel of the data plane in which the selected element resides may be a channel identifier or code corresponding to the channel. For example, if the selected element had the value '3.1' and resided within a channel with the identifier 'channel 3' said channel encapsulating values greater than 3.0 and less than 4.0, the hash may be performed on the value 'channel 3'.

The labelling scheme may be derived from a machine-learning classifier which operates over the dataset.

In a second aspect, the invention provides a computer-implemented method of analysing a dataset anonymised using the method of the first aspect, the method including the steps of:
 receiving an anonymised dataset from each of a plurality of data source computers;
 for each distance preserving hash, comparing the distance preserving hash with a respective distance preserving hash of another anonymised dataset; and
 estimating, based on the comparison, a distance between one or more element(s) having the same label in each of the anonymised datasets.

In examples where the distance preserving hash a multi-dimensional distance preserving hash, each dimension of each multi-dimensional hash may be compared with a respective dimension of the multi-dimensional hash of another anonymised dataset. Each of the dimensions of the multi-dimensional hashes may be given a different weighting when the distance is estimated. A higher weighting may be given to a first dimension which is indicative of a smaller distance space than a lower weighting given to a second dimension which is indicative of a larger distance space.

In a third aspect, the invention provides a system, including:
 one or more data source computers; and
 at least one analytics server;
 wherein each of the one or more data source computers are configured to prepare an anonymised dataset for the analytics server by:
  (a) labelling elements of a dataset to be analysed according to a labelling scheme;
  (b) selecting one or more labelled elements of the dataset to be replaced with a distance preserving hash; and for each selected element:
  (c) partitioning a data plane including the selected element into a plurality of channels, each channel covering a different distance space of the data plane;
  (d) hashing, using a cryptographic hash, data associated with the channel of the data [plane in which the selected element resides, to form the distance preserving hash;
  (e) replacing the selected element with the distance preserving hash; and
  (f) sending, to the analytics server, the anonymised dataset including the distance preserving hash once the contents of each selected element has been replaced.

The data source computers may be configured to perform any, or any combination, of the optional features of the first aspect.

In a fourth aspect, the invention provides a data source computer for preparing an anonymised dataset for an analytics server, the data source computer including memory and a processor, wherein the memory includes instructions which cause the processor to:
 (a) label elements of a dataset to be analysed according to a labelling scheme;
 (b) select one or more labelled elements of the dataset to be replaced with a distance preserving hash; and for each selected element:
 (c) partition a data plane including the selected element into a plurality of channels, each channel covering a different distance space of the data plane;

(d) hash, using a cryptographic hash, data associated with the channel of the data plane in which the selected element resides, to form the distance preserving hash; and (e) replace the selected element with the distance preserving hash.

The data source computer may be configured to perform any, or any combination, of the optional features of the first aspect.

In a fifth aspect, the invention provides a data analytics server for analysing anonymised datasets received from a plurality of data source computers, the server including memory and a processor, wherein the memory includes instructions which cause the processor to:

receive an anonymised dataset from each of a plurality of data source computers, each anonymised dataset including one or more distance preserving hashes;

for each distance preserving hash, compare the distance preserving hash with a respective distance preserving hash of another anonymised dataset; and estimate, based on the comparison, a distance between one or more element(s) having the same label in each of the anonymised datasets.

Further aspects of the present invention provide: a computer program comprising code which, when run on a computer, causes the computer to perform the method of the first or second aspect; a computer readable medium storing a computer program comprising code which, when run on a computer, causes the computer to perform the method of the first or second aspect; and a computer system programmed to perform the method of the first or second aspect.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Figure 2:
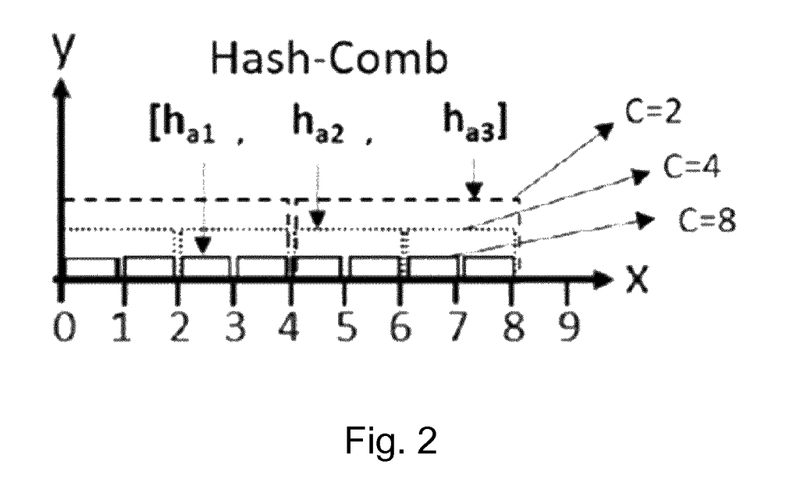
FIG. 2 illustrates a hash-comb according to the present invention.

Aspects and embodiments of the present invention will now be discussed with reference to the accompanying figures. Further aspects and embodiments will be apparent to those skilled in the art. All documents mentioned in this text are incorporated herein by reference FIG. 2 illustrates a hash-comb according to the present invention. A hash-comb is a series of $\omega$ traditional cryptographic hashes which substitute a private feature to anonymized, and can be referred to as a multi-dimensional distance preserving hash. Where $\omega=1$, the hash-comb may be referred to a distance preserving hash. Each cryptographic hash in a hash-comb describes a data point using $\omega$ different distance parameters. The example in FIG. 2 uses 3 hashes: $h_{a1}, h_{a2}, h_{a3}$. Each hash captures a different scope of distance information from data by partitioning the data plane into a plurality of channels C, and then performing the hashing process on those channels. Pre-computing multiple distance information into a hash allows for approximating the plaintext distance between two hash-combs, this would be impossible using a traditional cryptographic hashing technique.

To generate a hash-comb, participants should agree a set of parameters which include: the range of values R in the dataset (which in turn defines the data plane), the number of hashes $\omega$ to be generated, a number of channels C for each hash, the choice of cryptographic hash algorithm, and the channel size $\gamma$ for each hash. A number of protocols can be used to securely agree on the initial set of parameters, known per se to those skilled in the art.

After these parameters have been negotiated, a hash-comb can be generated using the following steps:

(1) Partition the data plane into channels, using the agreed parameters. The parameters affect the accuracy and privacy of the data, and are chosen according to the accuracy requirements and security tolerances. The channels are defined via quantization parameters where for each hash, the data plane is divided into C channels each of size $\gamma$. Both C and $\gamma$ should cover the entire range of R as shown in Equation 1. For example, taking car speed measurements, it can reasonably be expected that the range of values would be between 0 and 300. Choosing a channel size of 5 means that 60 channels are needed to cover the entire possible pool of values. Many approaches can be adopted for deciding on the values for C and $\gamma$. For example, C can be chosen based on domain experience and the value of max R as shown in Equation 2:

$$C\gamma \geq \max R \quad (1)$$

$$\gamma = \frac{\max R}{C} \quad (2)$$

(2) For all the points in the dataset, values of the data points are substituted with a value indicative of the channel within which they reside, e.g. the value of their channel number. This means that every point within a channel will have the same generalised value which represents a portion of the data space.

(3) The cryptographic hash of the new set of data points is computed for every generalized data point using the agreed on hash algorithm.

(4) Steps (1)-(3) are repeated $\omega$ times (For each element in the hash-comb) where each iteration has its own unique C and $\gamma$ values. Each round will generate a unique hash value.

(5) After step (4) is complete, each data point will be represented by $\omega$ unique digests where each digest is a non-metric value. The final representation for each anonymized data point can be represented as either a concatenation of the $\omega$ hashes as a single column, or $\omega$ columns with a distinct hash.

Steps (1)-(5) are shown in pseudocode with reference to Algorithm 1 below.

Since the hash-comb contains a series of non-metric hashes, a meaningful distance cannot be computed between any of the digests within any given Hash-Comb. As will be appreciated however, a distance can be computed between the digests of separate Hash-Combs. The quantization step allows a predetermined distance to be encapsulated into each of the hashes. Further, calculating multiple hashes using different quantization parameters allows for multiple distances to be stored in each hash. This gives the ability to measure with a degree of error an estimate distance between points using a simple Boolean expression, as discussed in more detail below.

The distance between two hash-combs can be computed via an element wise equality check. Given two distinct points a and b, each with hash-comb $h_{ai}$, $h_{bi}$ containing a set of three hashes i={1, 2, 3} can be provided. The distance between the two data points/hashes can be computed by comparing each hash value of $h_{ai}$ with the corresponding hash value from $h_{bi}$. In an example where only the third hash matches between hashes, the following Equations can be derived:

$$h_{a1} \neq h_{b1}$$

$$h_{a1} \neq h_{b2}$$

$$h_{a3} = h_{b3}$$

As can be seen, the first hashes are not equal, meaning that the original data points are not in the smallest quantization range and thus distance between the plaintext values of a and b is not within the minimum range. The second hashes are not equal either, meaning that the plaintext points do not fall together in the bigger quantization space. Finally, both the final hashes match which has the largest quantization range. Knowing the quantization ranges a priori gives the data processor the ability to estimate the distance range between the two data points through this process of elimination. In case all of the hashes are not equal, we can estimate that the distance range between the plaintext points is larger than the quantization space. The estimate distance obtained from non-metric data allows for using a hybrid of numerical and categorical data to obtain clusters which are comparable to the original fully metric dataset. However, to obtain good clustering results using this method, the equantity or inequality weight of each element in the hash-comb should not be treated with the same weight. Given the example in FIG. 1, having two equal hashes at $h_{a1}$ should be worth more weight than having two equal hashes at $h_{a3}$. While it is true that if $h_{a1} = h_{b1}$ then both $h_{a2}$, $h_{a3}$ will be equal to $h_{b2}$, $h_{b3}$ respectively because the larger quantization channels will include the smaller ones. The weights parameters are affected by the dataset and quantization parameters. It is still very important to find the right weight parameters to produce results that would be comparable to the plaintext.

Figure 3:
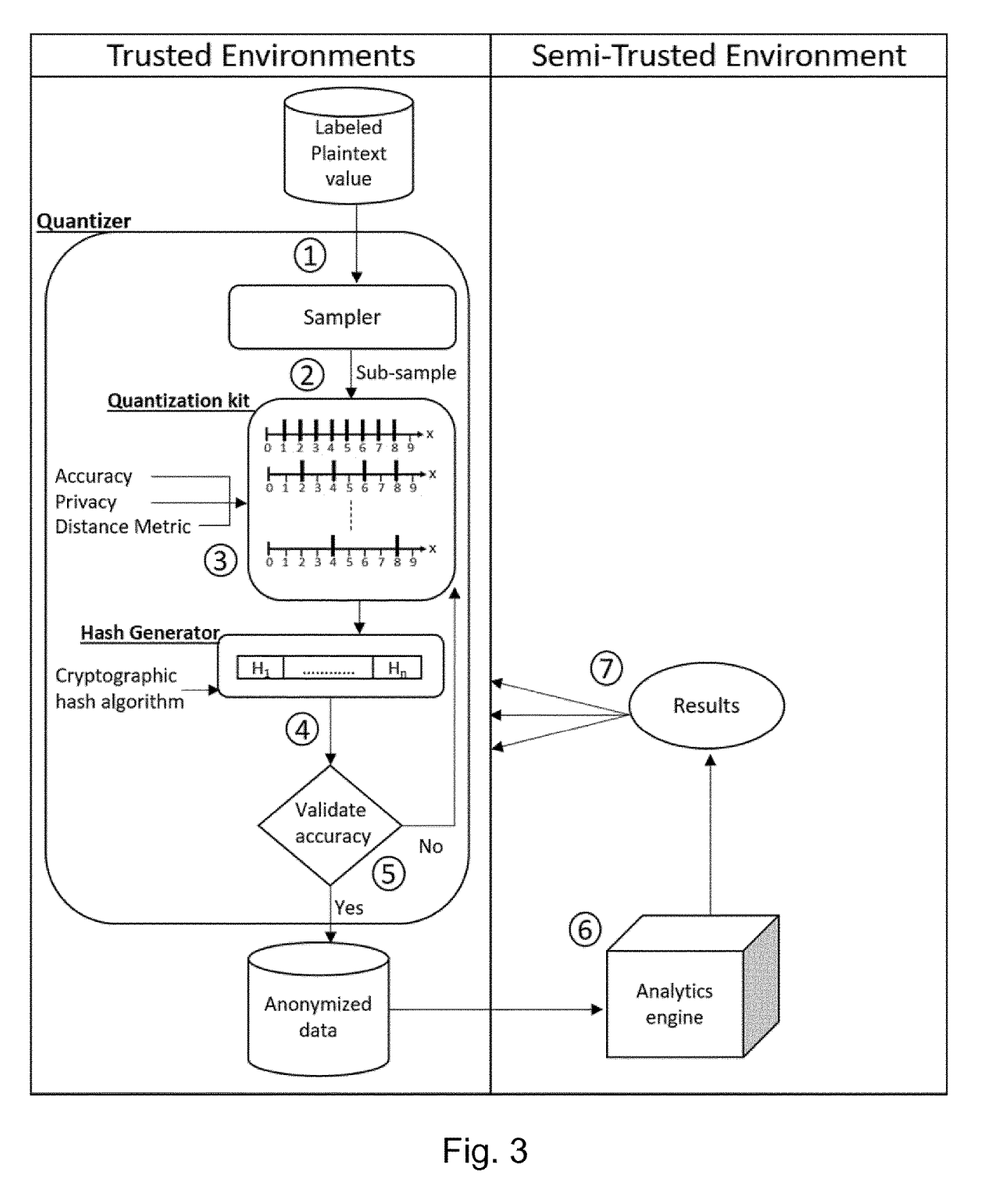
FIG. 3 is a work-flow schematic for the generation and exploitation of a hash-comb.

FIG. 3 illustrates a work space and work flow for generating hash-combs as discussed above.

In step (1), a data set is fed into the quantizer module. The dataset in this example is a set of labelled plaintext. The quantizer then choses a subsample from it. The subsample is kept for testing the accuracy of the quantization.

Next, in step (2), the requirements (accuracy, privacy, and distance metric) are given to the quantization kit, which in turn choses predefined initial quantization parameters for each dimension. The quantization parameters are used to split the plaintext domain into channels. The quantization parameters are generally derived empirically. However, one can use the QR metric discussed above to choose an approperitate privacy/expected accuracy configuration and verify it with the means of subsampling.

Subsequently, in step (3), the data points are cryptographically hashed using the channel identifier or a code corresponding to the channel identifier and the resulting hash is inserted into its place holder in the multi-dimensional hash representation. This process is repeated for the total number of dimensions chosen by the quantizer.

Next, in step (4), a test is performed using the anonymized data to give an estimate of the accuracy using the subsampled data collected in step (1).

A determination is then made, in step (5), where if the accuracy is over a threshold value the anonymized data is stored. If the accuracy is below the threshold value, the quantization kit is prompted to increase the number of dimensions and the entire process is repeated.

When the determination in step (5) is that the accuracy is over the threshold value, and the anonymised data has then been stored, the process moves to step (6). In step (6), the anonymized data is sent to a semi-trusted environment where the analysis is performed. A traditional machine learning approach can be used such as K-Prototypes or a neural network with minor modifications.

After this analysis is complete, the results are sent back to the participants.

Example 1—Sensor Data Quantization (Numerical)

To demonstrate the above principles, data was collected from road sensors deployed along a highway. These sensors captured the speed of oncoming traffic, the distance between cars, vehicle flow, and various other information. For the purposes of this example, the former three parameters are discussed as they hold value to cross country traffic management for traffic volume prediction, yet could be abused by a malicious entity.

The raw plaintext results were cleaned and labelled using cluster labels obtained via a K-means clustering algorithm. For each experiment, the speed was anonymized and replaced with a hash-comb of different parameters for comparison. However, in other examples only a single hash-comb could be used as it may be configured to hold all necessary information.

Figure 4:
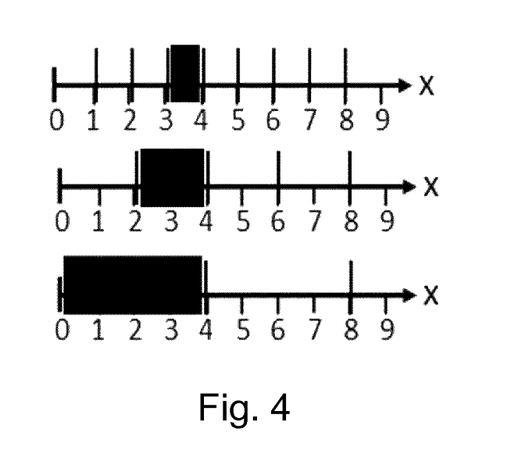
FIG. 4 is an illustration of a quantization configuration for use with generating a hash-comb.

Assuming, for this example, a data point with the value (3.5) is to be anonymized using the quantization configurations shown in FIG. 4, where the x axis represents the data plane within which the data point resides. The hash comb is constructed as shown in FIG. 5, as follows:

For the first quantization configuration, 3.5 will be in Channel 3, counting from 0;

For the second quantization configuration, 3.5 will be in Channel 1, counting from 0; and For the third quantization configuration, 3.5 will be in Channel 0, counting from 0.

Figure 5:
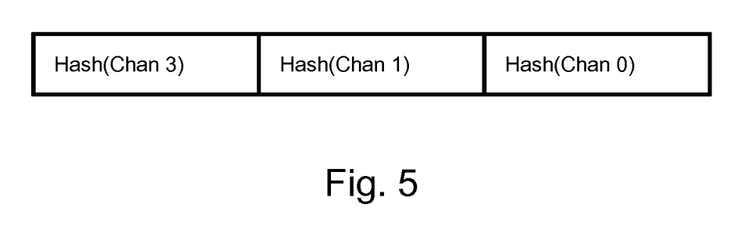
FIG. 5 illustrates a multi-dimensional hash-comb formed when using the quantization configured on FIG. 4.

The hash representing the value 3.5 under the 3 quantization configurations is shown in FIG. 5.

Figure 6:
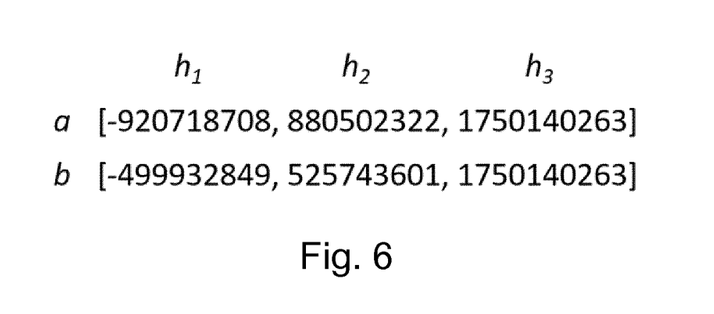
FIG. 6 is an element wise comparison between two hashes.

Having multiple dimensions for the hash facilitates the capture of distance information using cryptographic hashes which would naturally destroy any distance information. To compare two hashes, an element wise comparison can be performed as discussed previously. FIG. 6 illustrates two multi-dimensional hashes, a and b, each having three dimensions (or hashes): $h_1$, $h_2$, $h_3$. The first two elements of a and b are not equal, meaning that they are not within a distance of (1) or (2) from each other (see FIG. 4). However, the third element of a and b are equal, meaning that the distance between points a and b is higher than 2 but less than 4. This information can then be utilized in performing distance-based analytics without the need for the actual values of a and b.

Two approaches were considered in the subsequent analysis, in order to reproduce the results obtained on the plaintext using clustering and neural network classifiers.

Clustering

In the first set of experiments, the standard k-means clustering algorithm was used over the partially anonymized data without tweaking the weights of the hash-comb elements. It should be noted that the anonymization process transforms metric into categorical data. Moreover, it should be noted that k-means is not designed to work on categorical data. However, the implementation used herein addressed this by checking the equality and scoring a 1 if they are not equal or 0 if they are.

Two sets of scores were computed by comparing the points in each cluster form the plaintext set to every cluster form the anonymized sets (knowing the original data and anonymized output). The scores obtained measured the degree of similarity between the set of clusters produced over the plaintext and the clusters produced over the anonymized set. The highest score is achieved between two clusters if the points in both of them are exactly the same. The score was computed by dividing the absolute number of points that appeared in a plaintext and anonymized cluster over the size of the anonymized cluster.

The points in each plaintext cluster were compared to every anonymized cluster. Each plaintext cluster received a vector score of k scores denoted by $r_k$ representing its matching score with the anonymized cluster ID. A matrix was constructed from the score vectors such that the weight of the matrix is maximized on the diagonal. The score was computed by summing the diagonal of the matrix and dividing the total by the number of clusters as shown in the Equation below:

$$S = \frac{\Sigma_k^{i=1} d_i}{k} S = \frac{\Sigma_k^{i=1} d_i}{k}$$

$$\begin{bmatrix} d_i & & \\ & \ddots & \\ & & d_k \end{bmatrix}$$

Classification

In the second set of experiments, a neural network was trained to reproduce the same clustering/labelling obtained from the plaintext. The goal was to have the neural network utilize the hash-comb and to learn the weight parameters for each element in the hash-comb (as discussed above) as opposed to setting them manually. The network used in the work discussed herein was a feed forward model with 2 dense layers and a dropout rate of 0.03. The results were validated using 5 fold cross validation.

Setup and Results

In the tests, three sets of results were obtained under the initialization parameters shown in Table I with the following remarks:

TABLE I

| Labelling Method | Clustering Algorithm (K-Means) |
|---|---|
| Number of Clusters | 8 |
| Hashing Algorithms | SHA257, CRC32 |
| Traditional Hash | $\gamma$ = NULL |
| $\omega$ = 1 | $\gamma$ = 4 |
| $\omega$ = 3 | $\gamma$ = 2, 4, 8 |
| $\omega$ = 6 | $\gamma$ = 0.25, 0.5, 1, 2, 3, 4 |

The results are as shown in Table II, which shows two sets of scores computed using 3 hash-comb configurations and a traditional hash for comparison.

TABLE II

| $\omega$ | Clustering | Neural Network |
|---|---|---|
| Traditional hash | 32.70% | 83.64% (0.44%) |
| 1 | 36.10% | 87.97% (1.21%) |
| 3 | 32.37% | 89.39% (1.13%) |
| 6 | 27.03% | 98.54% (0.14%) |

It should be noted that the choices of cryptographic hashes are not limited to those shown. Deterministic encryption techniques can equally be used. The first set was obtained using both a clustering algorithm (k-means) and the second set using the previously described neural network. The results show that using a standard clustering technique over partially anonymised data using hash-combs yields relatively low accuracy. This is due to the k-means clustering algorithm being used without tweaking the weights of the hash-comb element equality as described above. Increasing the number of hashes does not produce any significant variation in the results. In fact, the fluctuation in the tables is considered to be due to the offset of the channels as indicated in Table II, rather than the number of elements in the hash-comb. The neural network produced very accurate results, reaching up to 95.45%. Increasing the number of hashes had a positive impact on accuracy, which is considered to be due to having more resolution in the hash-comb as described previously in relation to FIG. 1. It should also be noted that the neural network assigns the weights of equality between each hash-comb element as required to produce the plaintext labels.

The methods discussed above satisfy the data sharing regulations requirement by supporting the use of any cryptographic hash or deterministic encryption algorithm. This means the data owner has the ability to choose algorithms which meet their privacy requirements or government regulations. Furthermore, approved cryptographic hash functions are generally accepted as unfeasible to reverse within a reasonable time, and therefore an honest but curious adversary would not be able to reverse the data. When comparing hash-combs to a traditional hash, it is important to consider that traditional hashing only reveals exact quality and does not reveal any distance information. On the other hand, a hash-comb can reveal some distance information from the plaintext given that an adversary has an approximate knowledge of $\gamma$. Revising the example discussed above, a malicious entity could deduce that these two points are within a certain range of each other. This trade-off can be modified by controlled the values of $\omega$ and $\gamma$.

On the other hand, hash-combs add another layer of anonymity to the obfuscated data compared to hashing data traditionally because it removes the exact equality. Having two exactly equal hash-combs means that the respective data points are within a certain distance of each other but are not necessarily equal.

A further advantage provided by the above methods is that it allows the use of standard versions of machine learning algorithms in the analysis. Hash-combs can be used on a number of standard algorithms such as K-Prototypes which have been effectively deployed on MapReduce platforms. Other, well known, algorithms that support mixed numerical and categorical data can be used as well. However it is still important to tweak the weights between hash-comb elements to take into account distance parameters.

Whilst it is true that the size of data increases because of the method discussed above, which stores multiple representations of a single feature by substituting a column from the plaintext with ω anonymized columns compared to a single column used in traditional hashing, the size of the data is predictable because each hash-comb can have a fixed size depending on ω and the cryptographic hash algorithm used.

Example 2—Network Data Quantization (IP)

In another example, it may be necessary to share network data (e.g. bandwidth used, connections made, etc.) this dataset may include IP addresses, which are considered private. Therefore, the dataset may be labelled to indicate the different elements forming the dataset.

Figure 7:
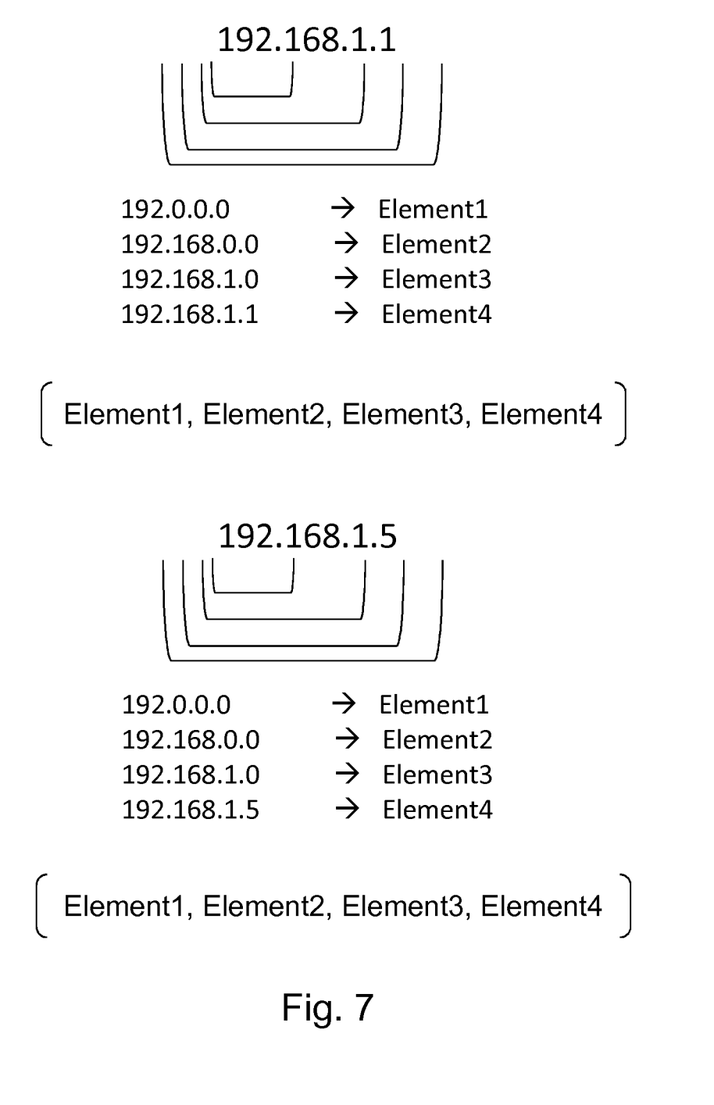
FIG. 7 shows a process of quantising two IP address into four dimensions respectively.

In the case of IP addresses, the quantization or partitioning can be performed over the IP blocks. Assuming the desire to compute a distance between the two IPs shown in FIG. 7, without revealing their values (as IP addresses are generally considered private personal information), the hash consists of four dimensions or elements each computed as shown in FIG. 7. Comparing these two hashes will show that the first three dimensions match each other, and therefore the IPs could be within the same subnet (i.e. sharing 192.168.1.X). This can enable grouping of IPs based on the prefix distance without knowing the actual value of this prefix, and is useful in certain networking and cybersecurity applications.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

---

Algorithm 1: Encoding Algorithm input: Data set
output: $h_0 \ldots h_\omega$, Score
Parameters: C, ω, γ, R
1. Generating Hashes;
2. for ω do 3. $\quad \gamma = \frac{\max R}{C}$;

4. $\quad$ for All N do
5. $\quad\quad N_i \rightarrow ch_i$;
6. $\quad$ end
7. $\quad h_i = \text{Hash}(C_i)$;
8. end
9. Comparing two digests;
10. for All i in $h_i$ do
11. $\quad$ if $h_{ai} == h_{bi}$ then
12. $\quad\quad$ Score++;
13. $\quad$ end
14. $\quad$ else Score = Score + 0;
15. end
16. END

---

[1] R. Lu, H. Zhu, X. Liu, J. K. Liu, and J. Shao, "Toward efficient and privacy-preserving computing in big data era," *IEEE Network*, vol. 28, no. 4, pp. 46-50, July 2014;

[2] S. Patel, V. Patel, and D. Jinwala, "Privacy Preserving Distributed K-Means Clustering in Malicious Model Using Zero Knowledge Proof," in *Distributed Computing and Internet Technology*, ser. Lecture Notes in Computer Science, Springer, Berlin, Heidelberg, February 2013, pp. 420-431;

[3] R. Akhter, R. J. Chowdhury, K. Emura, T. Islam, M. S. Rahman, and N. Rubaiyat, "Privacy-Preserving Two-Party k-Means Clustering in Malicious Model," in 2013 *IEEE 37th Annual Computer Software and Applications Conference Workshops*, July 2013, pp. 121-126;

[4] L. Xiong, V. Sunderam, L. Fan, S. Goryczka, and L. Pournajaf, "PREDICT: Privacy and Security Enhancing Dynamic Information Collection and Monitoring," *Procedia Computer Science*, Vol. 18 pp. 1979-1988, January 2013;

[5] S. Yakoubov, V. Gadepally, N. Schear, E. Shen, and A. Yerukhimovich, "A survey of cryptographic approaches to securing big-data analytics in the cloud", in 2014 *IEEE High Performance Extreme Computing Conference (HPEC)*, September 2014, pp. 1-6

[6] Z. Gheid and Y. Challal, "Efficient and Privacy-Preserving k-Means Clustering for Big Data Mining", in 2016 *IEEE Trustcom/BigDataSE/ISPA*, August 2016, pp. 791-798

All references referred to above are hereby incorporated by reference.

The invention claimed is:

1. A computer-implemented method of preparing an anonymised dataset for use in data analytics, the method including the steps of:
   (a) labelling elements of a dataset to be analysed according to a labelling scheme;
   (b) selecting a subsample from the dataset and deriving therefrom an accuracy threshold indicative of the distance between elements of data within the subsample;
   (c) deriving, from the anonymised dataset, an estimated accuracy of distance measurement between elements of the anonymised dataset and comparing this estimated accuracy to the accuracy threshold;
   (d) selecting one or more labelled elements of the dataset to be replaced with a distance preserving hash; and for each selected element:
   (e) partitioning a data plane including the selected element into a plurality of channels, each channel covering a different distance space of the data plane;
   (f) hashing, using a cryptographic hash, data associated with the channel of the data plane in which the selected element resides, to form the distance preserving hash; and
   (g) replacing the selected element with the distance preserving hash.

2. The computer-implemented method of claim 1, further comprising a step of sending, to an analytics server, the anonymised dataset including the distance preserving hash (es) once all of the selected elements have been replaced.

3. The computer-implemented method of claim 1, wherein if the estimated accuracy is less than the accuracy threshold, the value of ω is increased and steps (e)-(f) are repeated.

4. The computer-implemented method of claim 1, wherein the data associated with the channel of the data plane within which the selected element resides is a generalised value based on the content of the respective channel.

5. The computer-implemented method of claim 1, wherein the data associated with the channel of the data plane in which the selected element resides is a channel identifier or code corresponding to the channel.

6. The computer-implemented method of claim 1, wherein the labelling scheme is derived from a machine-learning classifier which operates over the dataset.

7. A computer-implemented method of analysing a dataset anonymised using the method of claim 1, the method including the steps of:
  receiving an anonymised dataset from each of a plurality of data source computers;
  for each distance preserving hash, comparing the distance preserving hash with a respective distance preserving hash of another anonymised dataset; and
  estimating, based on the comparison, a distance between one or more element(s) having the same label in each of the anonymised datasets.

8. The computer-implemented method of claim 7, wherein each dimension of each multi-dimensional hash is compared with a respective dimension of the multi-dimensional hash of another anonymised dataset.

9. The computer-implemented method of claim 8, wherein each of the dimensions of the multi-dimensional distance hashes is given a different weighting when the distance is estimated.

10. The computer-implemented method of claim 9, wherein a higher weighting is given to a first dimension which is indicative of a smaller distance space than a lower weighting given to a second dimension which is indicative of a larger distance space.

11. The computer-implemented method of claim 1, wherein the distance preserving hash is multi-dimensional distance preserving has having ω dimensions, each dimension being formed of C channels, each channel having a size γ, and wherein the steps (e)-(f) are repeated for each dimension of the multi-dimensional distance preserving hash.

12. The computer-implemented method of claim 11, wherein ω is selected based on any one or more of: an accuracy metric, a privacy metric, and a distance metric.

13. The computer-implemented method of claim 11, wherein ω is selected based on a quantization resolution metric, which is indicative of a distance from a given distance preserving hash to the associated selected element.

14. A system, including:
  one or more data source computers; and
  at least one analytics server;
  wherein each of the one or more data source computers are configured to prepare an anonymised dataset for the analytics server by:
  (a) labelling elements of a dataset to be analysed according to a labelling scheme;
  (b) selecting a subsample from the dataset and deriving therefrom an accuracy threshold indicative of the distance between elements of data within the subsample;
  (c) deriving, from the anonymised dataset, an estimated accuracy of distance measurement between elements of the anonymised dataset and comparing this estimated accuracy to the accuracy threshold;
  (d) selecting one or more labelled elements of the dataset to be replaced with a distance preserving hash; and for each selected element:
  (e) partitioning a data plane including the selected element into a plurality of channels, each channel covering a different distance space of the data plane;
  (f) hashing, using a cryptographic hash, data associated with the channel of the data plane in which the selected element resides, to form the distance preserving hash;
  (g) replacing the selected element with the distance preserving hash; and
  (h) sending, to the analytics server, the anonymised dataset including the distance preserving hash once the contents of each selected element has been replaced.

15. A data source computer for preparing an anonymised dataset for an analytics server, the data source computer including memory and a processor, wherein the memory includes instructions which cause the processor to:
  (a) label elements of a dataset to be analysed according to a labelling scheme;
  (b) selecting a subsample from the dataset and deriving therefrom an accuracy threshold indicative of the distance between elements of data within the subsample;
  (c) deriving, from the anonymised dataset, an estimated accuracy of distance measurement between elements of the anonymised dataset and comparing this estimated accuracy to the accuracy threshold;
  (d) select one or more labelled elements of the dataset to be replaced with a distance preserving hash; and for each selected element:
  (e) partition a data plane including the selected element into a plurality of channels, each channel covering a different distance space of the data plane;
  (f) hash, using a cryptographic hash, data associated with the channel of the data plane in which the selected element resides, to form the distance preserving hash; and
  (g) replace the selected element with the distance preserving hash.

* * * * *